United States Patent
Kubota

(10) Patent No.: US 10,425,862 B2
(45) Date of Patent: *Sep. 24, 2019

(54) METHOD AND APPARATUS FOR EMPLOYING AN INDICATION OF STORED TEMPORARY INFORMATION DURING REDIRECTION

(71) Applicant: NOKIA TECHNOLOGIES OY, Espoo (FI)

(72) Inventor: Keiichi Kubota, Weybridge (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/119,381

(22) Filed: Aug. 31, 2018

(65) Prior Publication Data
US 2019/0021027 A1   Jan. 17, 2019

Related U.S. Application Data

(63) Continuation of application No. 13/637,840, filed as application No. PCT/FI2011/050105 on Feb. 8, 2011, now Pat. No. 10,070,346.

(Continued)

(51) Int. Cl.
*H04W 36/00* (2009.01)

(52) U.S. Cl.
CPC .... *H04W 36/0022* (2013.01); *H04W 36/0061* (2013.01)

(58) Field of Classification Search
CPC .............. H04W 36/0022; H04W 36/0061
See application file for complete search history.

(56) References Cited

U.S. PATENT DOCUMENTS

| 5,434,798 A | 7/1995 | Madebrink et al. |
| 5,903,839 A * | 5/1999 | Mattila ................ H04W 36/06 455/434 |

(Continued)

FOREIGN PATENT DOCUMENTS

| CN | 1371576 A | 9/2002 |
| CN | 1822700 A | 8/2006 |

(Continued)

OTHER PUBLICATIONS

"3rd Generation Partnership Project; Technical Specification Group Services and System Aspects; Circuit Switched Fallback in Evolved Packet System; Stage 2, (Release 9)", 3GPP TS 23.272, V9.2.0, Dec. 2009, pp. 1-64.

(Continued)

*Primary Examiner* — Will W Lin
(74) *Attorney, Agent, or Firm* — Alston & Bird LLP

(57) ABSTRACT

A method for employing an indication of stored temporary information during redirection may include receiving a temporary stored information indicator from a mobile terminal indicating that the mobile terminal stores a system information container comprising temporary information, and determining whether to replace the temporary information with non-temporary information based on reception of the temporary stored information indicator. Alternatively, the method may include receiving a system information container for at least one target cell, storing the system information container, and generating a temporary stored information indicator at a mobile terminal indicating that the mobile terminal stores the system information container comprising temporary information. Corresponding apparatuses and computer program products are also provided.

20 Claims, 8 Drawing Sheets

Related U.S. Application Data

(60) Provisional application No. 61/319,541, filed on Mar. 31, 2010.

(56) References Cited

U.S. PATENT DOCUMENTS

| | | | |
|---|---|---|---|
| 6,628,946 B1* | 9/2003 | Wiberg | H04W 48/12 455/434 |
| 6,819,923 B1 | 11/2004 | Friman | |
| 2002/0193111 A1* | 12/2002 | Wallstedt | H04W 16/16 455/434 |
| 2003/0189912 A1* | 10/2003 | Laitinen | H04W 8/183 370/338 |
| 2005/0181801 A1 | 8/2005 | Funnell | |
| 2006/0084443 A1* | 4/2006 | Yeo | H04W 36/0061 455/449 |
| 2006/0183482 A1* | 8/2006 | Ueda | H04W 36/0061 455/439 |
| 2008/0108353 A1* | 5/2008 | Lee | H04J 11/0093 455/437 |
| 2009/0011757 A1* | 1/2009 | Tenny | H04W 36/30 455/425 |
| 2009/0075690 A1 | 3/2009 | Roberts et al. | |
| 2009/0264077 A1* | 10/2009 | Damnjanovic | H04W 52/244 455/63.1 |
| 2009/0285157 A1* | 11/2009 | Yeoum | H04W 36/0022 370/328 |
| 2010/0022250 A1* | 1/2010 | Petrovic | H04J 11/0093 455/450 |
| 2010/0177736 A1* | 7/2010 | Wang | H04L 1/1642 370/331 |
| 2010/0304748 A1 | 12/2010 | Henttonen et al. | |
| 2011/0039551 A1* | 2/2011 | Tsuboi | H04W 48/20 455/424 |
| 2011/0122845 A1* | 5/2011 | Meirosu | H04W 36/0055 370/332 |
| 2011/0188468 A1* | 8/2011 | Vikberg | H04W 36/0066 370/331 |
| 2011/0280217 A1 | 11/2011 | Drevon et al. | |
| 2012/0329459 A1 | 12/2012 | Narasimha et al. | |
| 2013/0059564 A1 | 3/2013 | Jung et al. | |
| 2013/0237201 A1 | 9/2013 | Futaki | |

FOREIGN PATENT DOCUMENTS

| | | |
|---|---|---|
| WO | WO-2000/072609 A1 | 11/2000 |
| WO | WO-2007/113457 A1 | 10/2007 |
| WO | WO-2010/048178 | 4/2010 |

OTHER PUBLICATIONS

"Overview of 3GPP Release 6—Summary of All Release 6 Features—Verstion TSG #33", European Telecommunications Standards Institute, Mobile Competence Centre, 2006, pp. 1-88.

"Overview of 3GPP Release 8 V0.3.3" [retrieved Mar. 2, 2017]. Retrieved from the Internet: <URL: http://www.3gpp.org/ftp/Information/WORK_PLAN/Description_Releases/Rel-08_description_20140924.zip> (dated Sep. 2014) 244 pages.

"Digital cellular telecommunications system (Phase 2+); Universal Mobile Telecommunications System (UMTS); Network Assisted Cell Change (NACC) from UTRAN to GERAN; Network side aspects (3GPP TR 25.901 version 7.0.0 Release 7)", ETSI TR 125 901, V7.0.0, Jun. 2007, pp. 1-20.

NTT Docomo, Inc., Redirection enhancements to UTRAN, 3GPP TSG-RAN WG2 # 68bis, R2-100528, Jan. 22, 2010.

NTT Docomo, Inc., AT&T, Panasonic, NEC, Fujitsu, Huawei, Ericsson, ST-Ericsson, Qualcomm Incorporated, CATT, Orange, Research in Motion UK Limited, ZTE, Alcatel-Lucent, TD Tech, Redirection enhancements to UTRAN, 3GPP TSG-RAN Meeting #47, RP-100314, Mar. 19, 2010, pp. 1-11.

Nokia Corporation, Nokia Siemens Networks, Redirection Enhancements to UTRAN: Introduction of system information container stored indication, 3GPP TSG-RAN WGZ # 69bis. R2-102314, Apr. 1, 2010.

International Search Report and Written Opinion received for corresponding Patent Cooperation Treaty Application No. PCT/FI2011/050105, dated May 11, 2011, 14 pages.

Office Action received for corresponding Japanese Application No. 2013-501877, dated Nov. 18, 2013.

Office Action received for corresponding Japanese Application No. 2013-501877, dated Nov. 18, 2013, 4 pages.

Office Action for Chinese Application No. 201180016842.0 dated Mar. 9, 2015.

Office Action for Chinese Application No. 201180016842.0 dated Nov. 5, 2015.

Office Action for Argentinian Patent Application No. 20110100919 dated Feb. 8, 2017, with English summary, 5 pages.

Office Action for U.S. Appl. No. 13/637,840 dated Apr. 24, 2014, 30 pages.

Office Action for U.S. Appl. No. 13/637,840 dated Aug. 14, 2014, 27 pages.

Final Office Action for U.S. Appl. No. 13/637,840 dated Mar. 20, 2015, 22 pages.

Office Action for U.S. Appl. No. 13/637,840 dated Aug. 13, 2015, 19 pages.

Office Action for U.S. Appl. No. 13/637,840 dated Jun. 28, 2016, 21 pages.

Final Office Action for U.S. Appl. No. 13/637,840 dated Feb. 19, 2016, 24 pages.

Final Office Action for U.S. Appl. No. 13/637,840 dated Apr. 17, 2017, 25 pages.

Extended European Search Report for European Patent Application No. 11762067.4 dated May 24, 2017, 6 pages.

Office Action for U.S. Appl. No. 13/637,840 dated Dec. 22, 2017.

Notice of Allowance for U.S. Appl. No. 13/637,840 dated May 3, 2018.

Advisory Action for U.S. Appl. No. 13/637,840 dated Jun. 16, 2015.

Office Action for Indian Application No. 8714/CHENP/2012 dated Feb. 4, 2019.

* cited by examiner

METHOD AND APPARATUS FOR EMPLOYING AN INDICATION OF STORED TEMPORARY INFORMATION DURING REDIRECTION

CROSS-REFERENCE TO RELATED APPLICATIONS

This application is a continuation of U.S. application Ser. No. 13/637,840, filed Sep. 27, 2012, which is a national phase entry of International Application No. PCT/FI2011/050105, filed Feb. 8, 2011, which claims priority to U.S. Provisional Application No. 61/319,541, filed Mar. 31, 2010, the entire contents of which are incorporated herein by reference.

TECHNOLOGICAL FIELD

Embodiments of the present invention relate generally to wireless communication technology and, more particularly, relate to an apparatus and method for employing an indication of stored temporary information during redirection.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. For example, the universal mobile telecommunications system (UMTS) terrestrial radio access networks (UTRAN) and the GERAN (GSM/EDGE radio access network) system are currently being developed. The E-UTRAN (evolved UTRAN), which is also known as Long Term Evolution (LTE) or 3.9G, is aimed at upgrading prior technologies by improving efficiency, lowering costs, improving services, making use of new spectrum opportunities, and providing better integration with other open standards.

An advantage of the communication systems currently under development, which continues to be shared with other preceding telecommunication standards, is the fact that users are enabled to access a network employing such standards while remaining mobile. Thus, for example, users having mobile terminals (or user equipment (UE)) equipped to communicate in accordance with such standards may travel vast distances while maintaining communication with the network. By providing access to users while enabling user mobility, services may be provided to users while the users remain mobile.

A basic architecture of a communication system may include a core (e.g., a third generation (3G) core, an evolved packet core (EPC) or the like) in communication with various nodes (e.g., base stations, access points, node Bs (NBs) or evolved node Bs (eNBs)). Each of the nodes may transmit over an air interface to a particular region or regions defined as cells. The nodes may define corresponding cells in which communication coverage is provided by a respective node. As such, a geographical area may be provided with coverage defined by a plurality of cells. Moreover, given that multiple radio access networks are currently in simultaneous use, it is possible that cells of different radio access technologies (RATs) may overlap.

System Architecture Evolution (SAE) of the third generation partnership project (3 GPP) release 8 specifies a packet switched (PS) core network architecture for LTE. By definition, certain circuit switched (CS) services (e.g., voice, short message service (SMS), UDI, etc.) are not available in a PS only core network. Accordingly, CS services may only be available if a particular terminal (e.g., a UE) moves (or falls back) from the LTE/SAE domain to a CS domain of a legacy RAT (e.g., GERAN or UTRAN) whenever there is an incoming or outgoing CS service indication such as a page, CS service request or the like.

Previously, establishing a CS fallback capability has been defined as a simple procedure of triggering the terminal to move to the legacy RAT where there is CS domain support in response to a CS service indication. There have been two main RAT change methods proposed including PS handover and redirection. Redirection is a method involves E-UTRAN sending a message (e.g., a RRC CONNECTION RELEASE message) with redirection information indicating to which RAT and carrier the terminal is to move. However, it may be desirable to implement redirection in an efficient manner with respect to radio network resources.

BRIEF SUMMARY

Some embodiments of the present invention are therefore provided that may enable efficient implementation of fallback operations. In particular, some embodiments of the present invention may provide for the use of an indicator of temporary stored information to be employed in connection with redirection during fallback scenarios. As such, for example, the indicator of temporary stored information may be used to enable provision of a reduced or simplified neighbor cell list during redirection and the neighbor cell list may be updated after redirection to improve network efficiency.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 6:
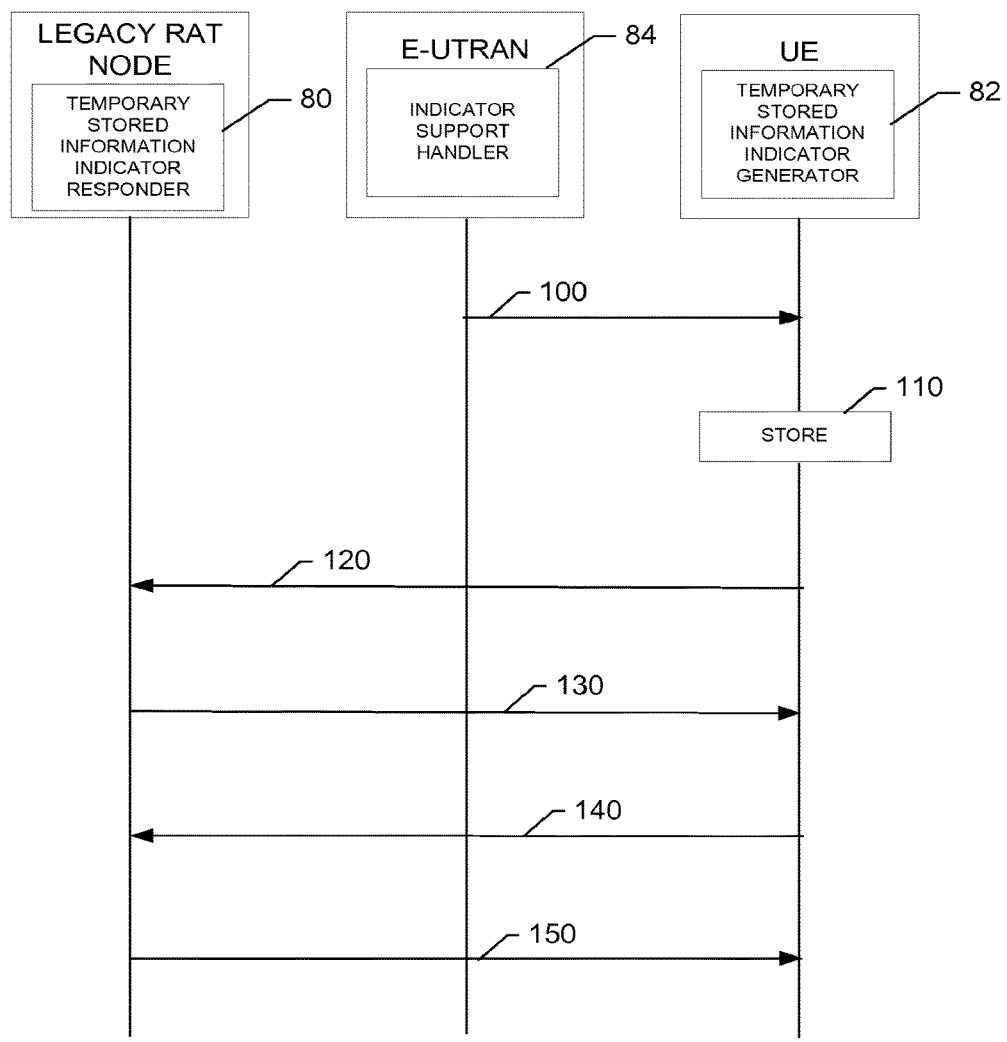
Figure 7:
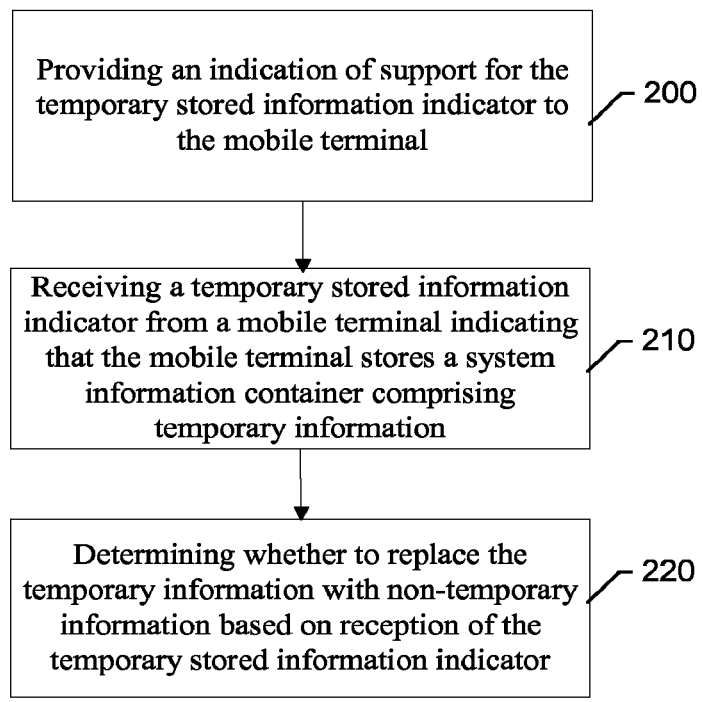
Figure 8:
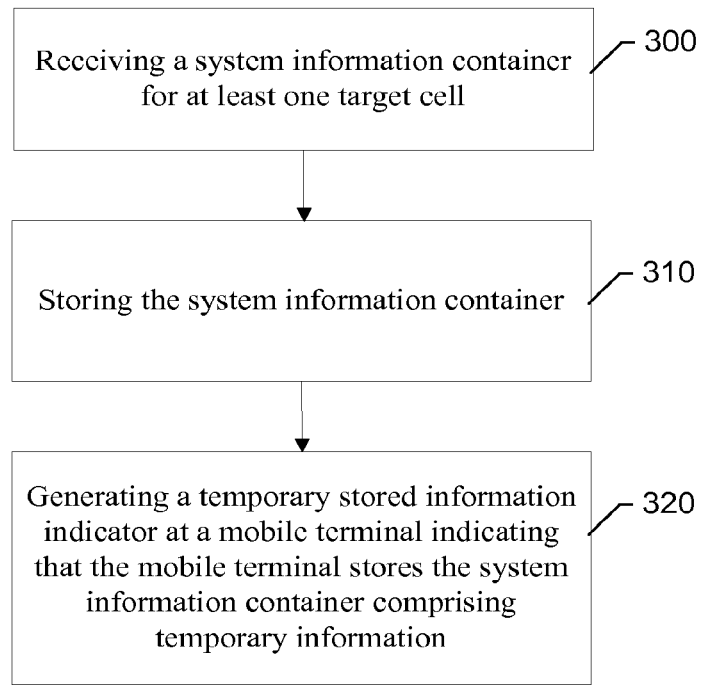

FIG. 6 is a control flow diagram showing a basic exchange of messages according to an example embodiment of the present invention FIG. 7 is a flowchart according to a method of employing an indication of stored temporary information during redirection according to an example embodiment of the present invention; and FIG. 8 is a flowchart according to an alternative method of employing an indication of stored temporary information during redirection according to an example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

As indicated above, some embodiments of the present invention may relate to the implementation of redirection as a CS fallback option. During redirection, the E-UTRAN typically sends a radio resource control (RRC) connection release message that identifies redirection information. For example, the redirection information may include a system information container for system information identifying each of a plurality of target cells. The system information container may include system information blocks (SIB) (e.g., SIB 1, 3, 5 and 7) and a neighbor cell list. The neighbor cell list (e.g., SIB 11, 11bis and/or 12) may be used by a mobile terminal being redirected for selection of a suitable cell to maintain a call or connection. SIB 1, 3, 5 and 7 are typically relatively easy to maintain in E-UTRAN since they are not dynamically updated. However, the neighbor cell list is potentially quite large and is also dynamically updateable since network operators may frequently change UTRA cell deployment by adding or removing cells. Moreover, in some examples a cell could have up to ninety-six neighbor cells.

One solution for providing network assisted cell change is referred to as RAN information management (RIM). However, RIM requires a substantial implementation effort and may not be fully supported and therefore not fully interoperable. Deferred measurement performed by terminals has also been previously suggested. Deferred measurement involves the terminal initiating a RRC connection establishment before acquiring SIB11, 11bis, or SIB 12, event when one of the SIBs is scheduled on the serving cell. After the initiation of the connection establishment, the terminal continues acquiring SIB11, 11bis, or SIB 12.

In some embodiments, a temporary neighbor cell list may be provided initially, and a complete neighbor cell list may then be provided after completion of the redirection procedure. Accordingly, bandwidth consumption associated with provision of the complete neighbor cell may be deferred until redirection is complete. Furthermore, some embodiments of the present invention may also provide for the terminal to store the temporary neighbor cell initially provided and use the temporary neighbor cell for a limited period of time. The terminal may then provide an indication to the network to indicate that the temporary neighbor cell list is being stored. The network may then replace the temporary neighbor cell list with a complete list in response to receipt of the indication. Accordingly, for example, sending the complete neighbor cell list may be avoided except in appropriate situations.

Figure 1:
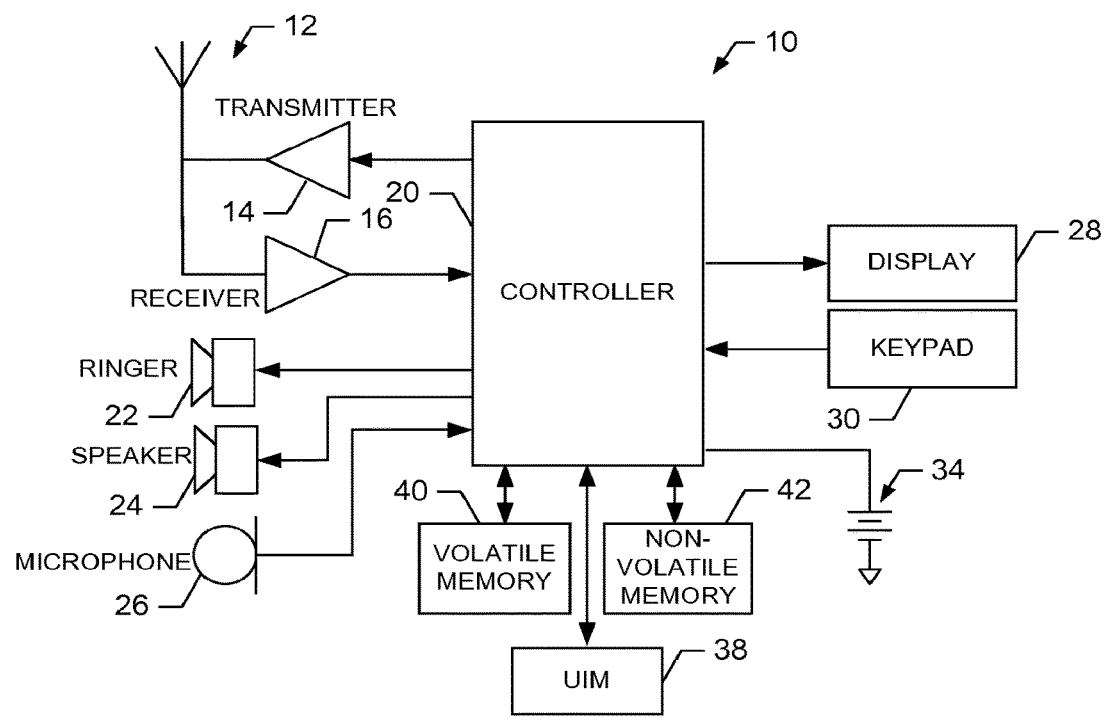
FIG. 1 is a schematic block diagram of a mobile terminal according to an example embodiment of the present invention.

FIG. 1, one example embodiment of the invention, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, numerous types of mobile terminals, such as portable digital assistants (PDAs), mobile telephones, pagers, mobile televisions, gaming devices, laptop computers, cameras, video recorders, audio/video player, radio, positioning devices (e.g., global positioning system (GPS) devices, or any combination of the aforementioned, and other types of voice and text communications systems, may readily employ embodiments of the present invention.

The mobile terminal 10 may include an antenna 12 (or multiple antennas) in operable communication with a transmitter 14 and a receiver 16. The mobile terminal 10 may further include an apparatus, such as a controller 20 or other processing device, which provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN, with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks described below in connection with FIG. 2.

In some embodiments, the controller 20 may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10. For example, the memories may include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which determines an identity of the current cell, e.g., cell id identity or cell id information, with which the mobile terminal 10 is in communication.

Figure 2:
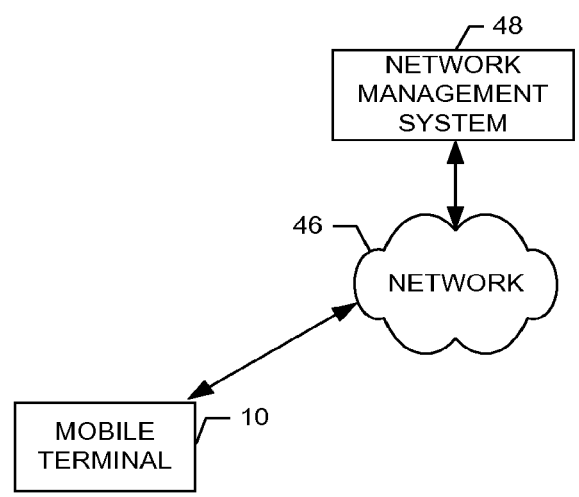
FIG. 2 is a schematic block diagram of a wireless communications system according to an example embodiment of the present invention.

FIG. 2 is a schematic block diagram of a wireless communications system according to an example embodiment of the present invention. Referring now to FIG. 2, an illustration of one type of system that would benefit from embodiments of the present invention is provided. As shown in FIG. 2, a system in accordance with an example embodiment of the present invention includes a communication device (e.g., mobile terminal 10) that may be capable of communication with a network 46. The mobile terminal 10 may be an example of one of several communications devices of the system that may be able to communicate with network devices or with each other via the network 46. In some cases, various aspects of operation of the network 46 may be managed by one or more network devices. As an example, the network 46 may include a network management system 48, which may be involved with (perhaps among other things) performing network management functions. As such, the network management system 48 of an example embodiment may include mobility management and gateway functions as described in greater detail below.

In an example embodiment, the network 46 includes a collection of various different nodes, devices or functions that are capable of communication with each other via corresponding wired and/or wireless interfaces. As such, the illustration of FIG. 2 should be understood to be an example of a broad view of certain elements of the system and not an all inclusive or detailed view of the system or the network 46. Although not necessary, in some embodiments, the network 46 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like.

One or more communication terminals such as the mobile terminal 10 and other communication devices may be capable of communication with each other via the network 46 and each may include an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing devices or elements (e.g., personal computers, server computers or the like) may be coupled to the mobile terminal 10 and the other communication devices via the network 46. By directly or indirectly connecting the mobile terminal 10 and the other communication devices to the network 46, the mobile terminal 10 and the other communication devices may be enabled to communicate with network devices and/or each other, for example, according to numerous communication protocols including WAP, HTTP and/or the like, to thereby carry out various communication or other functions of the mobile terminal 10 and the other communication devices, respectively.

Furthermore, although not shown in FIG. 2, the mobile terminal 10 may communicate in accordance with, for example, radio frequency (RF), Bluetooth (BT), Infrared (IR) or any of a number of different wireline or wireless communication techniques, including LAN, wireless LAN (WLAN), universal serial bus (USB), Worldwide Interoperability for Microwave Access (WiMAX), WiFi, ultra-wide band (UWB), Wibree techniques and/or the like. As such, the mobile terminal 10 may be enabled to communicate with the network 46 and other devices by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, and/or the like and fixed access mechanisms such as digital subscriber line (DSL), cable modems, Ethernet and/or the like.

In an example embodiment, the network management system 48 may be a device, node or collection of devices and nodes such as a server, computer or other network device. The network management system 48 may have any number of functions or associations with various services. As such, for example, the network management system 48 may be a platform such as a dedicated server (or server bank) associated with a particular information source or service (e.g., network management services), or the network management system 48 may be a backend server associated with one or more other functions or services. As such, the network management system 48 represents a potential host for a plurality of different network management services. In some embodiments, the functionality of the network management system 48 is provided by hardware and/or software components configured to operate in accordance with known techniques for the provision of network management services to the network 46. However, at least some of the functionality provided by the network management system 48 is may be provided in accordance with example embodiments of the present invention.

Figure 3:
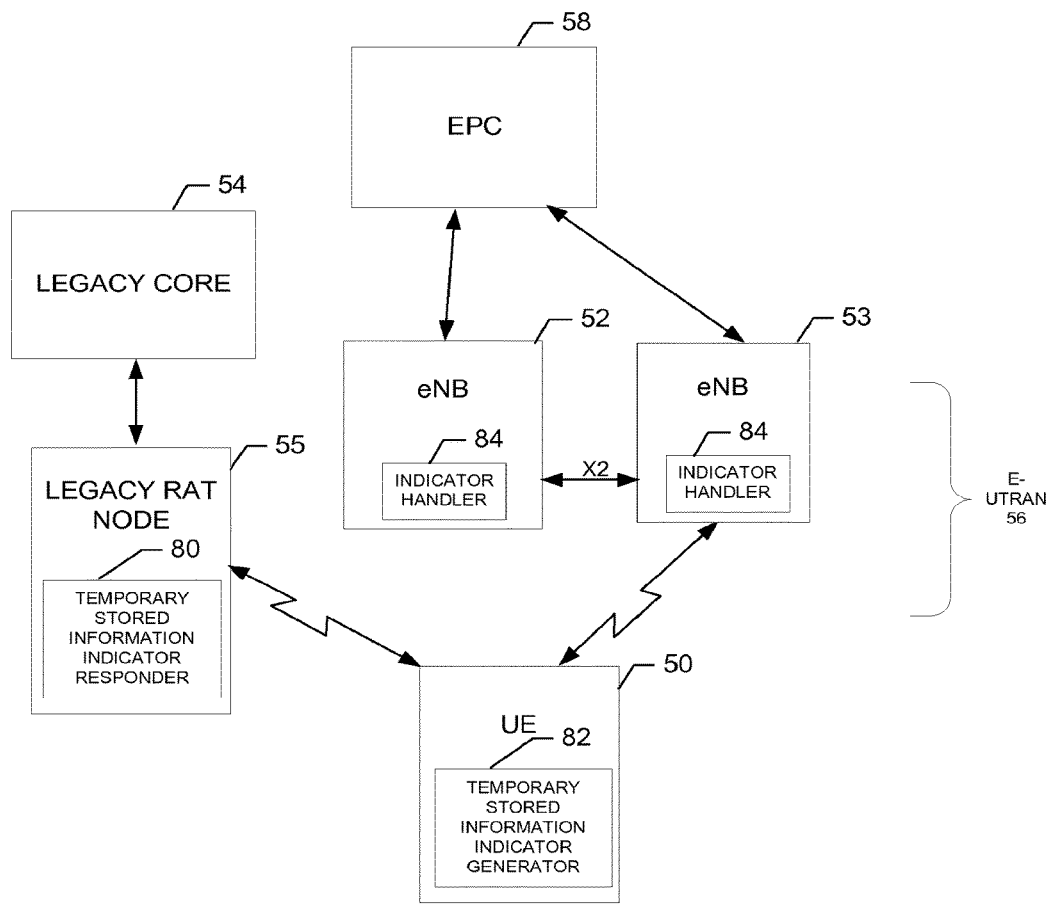
FIG. 3 illustrates a schematic block diagram of a system for employing an indication of stored temporary information during redirection according to an example embodiment of the present invention.

An example embodiment of the invention will now be described with reference to FIG. 3, in which certain elements of a system for employing an indication of stored temporary information during redirection are displayed. The system of FIG. 3 represents a specific embodiment of a network such as the general network displayed in FIG. 2, except that FIG. 3 represents a general block diagram of an E-UTRAN and some other legacy RAT that may be involved in providing fallback options (e.g., for CS fallback). As such, in connection with FIG. 3, user equipment (UE) 50 may be example of one embodiment of the mobile terminal 10 of FIGS. 1 and 2, and eNBs (E-UTRAN node Bs) 52 and 53 may be examples of base stations or access points that may serve respective cells or areas within the network 30 to, together with other eNBs, NBs, base stations or access points, define the coverage provided by the network 46 for use by mobile users. However, it should be noted that the system of FIG. 3, may also be employed in connection with a variety of other devices, both mobile and fixed, and therefore, embodiments of the present invention should not be limited to application on devices such as the mobile terminal 10 of FIG. 1 or the network devices of FIGS. 2 and 3. Moreover FIG. 3, which illustrates E-UTRAN components and other legacy RATs, should be understood to be just an example of one type of architecture with which embodiments of the present invention may be employed.

Referring now to FIG. 3, the system includes an E-UTRAN 56 which may include, among other things, a plurality of node-Bs in communication with an evolved packet core (EPC) 58 which may include one or more mobility management entities (MMES) and one or more system architecture evolution (SAE) gateways. The node-Bs may be E-UTRAN node-Bs (e.g., eNB 52 and eNB 53) and may also be in communication with the UE 50 and other UEs. The E-UTRAN 56 may be in communication with the EPC 58. In an example embodiment, the network management system 48 of FIG. 2 may be an example of a device or collection of devices within the EPC 58 and/or within a legacy RAT node 55 that may be configured to employ an example embodiment of the present invention.

The eNBs 52 and 53 may provide E-UTRA user plane and control plane (radio resource control (RRC)) protocol terminations for the UE 50. The eNBs 52 and 53 may provide functionality hosting for such functions as radio resource management, radio bearer control, radio admission control, connection mobility control, dynamic allocation of resources to UEs in both uplink and downlink, selection of an MME at UE attachment, IP header compression and encryption, scheduling of paging and broadcast information, routing of data, measurement and measurement reporting for configuration mobility, and the like.

The MME may host functions such as distribution of messages to respective node-Bs, security control, idle state mobility control, EPS (Evolved Packet System) bearer control, ciphering and integrity protection of (non access stratum) NAS signaling, and the like. The SAE gateway may host functions such as termination and switching of certain packets for paging and support of UE mobility. In an example embodiment, the EPC 58 may provide connection to a network such as the Internet.

As shown in FIG. 3, the UE 50 may also be capable of communication with a legacy core 54 via a legacy RAT node 55 (e.g., an access point, node or base station associated with a legacy RAT, for example Radio Network Control—RNC or Node B). In an example embodiment, the legacy RAT may be assumed to be a CS domain RAT. As such, for example, if the UE 50 is in communication with one of the eNBs 52 and 53 of the EPS and a CS service indication is detected (e.g., an incoming or outgoing CS service indication such as a page, CS service request or the like), the UE 50 may be enabled to conduct a handover (e.g., a PS handover) or be redirected to the CS domain by switching to communication with the legacy RAT node 55. Thus, the UE 50 may be enabled to utilize a CS fallback capability by switching to communication with the legacy RAT node 55 to respond to service indications that are not related to LTE services.

In an example embodiment, redirection may be implemented in the context described above, or even in other contexts, in an environment in which the network (e.g., via the network management system 48) provides temporary information (e.g., a temporary neighbor cell list) to the UE 50 for use in connection with implementation of redirection. The UE 50 may use the temporary information until a certain point (e.g., until a connection is established with a target RAT such as via the legacy RAT node 55 from the eNB 53 of FIG. 3) and then the UE 50 may inform the network that the UE 50 is storing the temporary information after reaching the certain point. In an example embodiment, the informing that the UE 50 provides to the network may be accomplished via a temporary stored information indicator (e.g., a flag or one bit field in uplink signaling). In response to receipt of the temporary stored information indicator, which indicates to the network that the UE 50 is storing temporary information such as the temporary neighbor cell list, the network may decide whether to trigger replacement of the temporary information with non-temporary information (e.g., a complete neighbor list) and/or the network may decide whether to trigger UE to move into CELL_DCH state or CELL_FACH state during a RRC connection establishment procedure based on the indicator. Accordingly, the network can avoid implementing RIM or other mechanisms for network assisted cell change that may require larger implementation efforts and the UE 50 can avoid using a deferred measurement feature.

Figure 4:
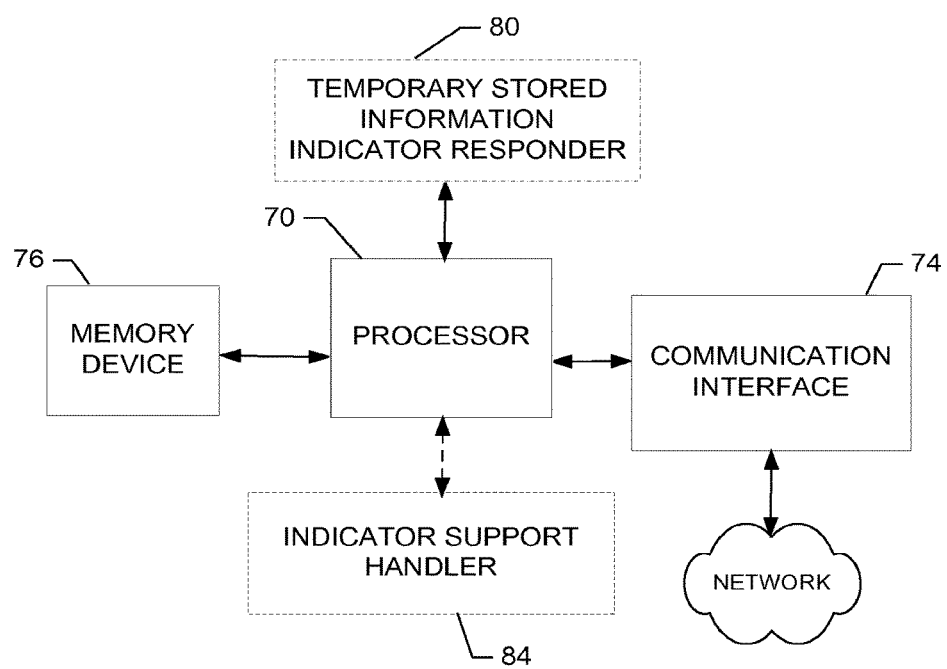
FIG. 4 illustrates a block diagram showing a network side apparatus for employing an indication of stored temporary information during redirection according to an example embodiment of the present invention.

FIG. 4 shows a block diagram view of one example of an apparatus configured to perform example embodiments of the present invention. In this regard, for example, an apparatus for employing an indication of stored temporary information during redirection according to an example embodiment of the present invention may be embodied as or otherwise employed, for example, on an apparatus of the network (e.g., the network management system 48, a device within the legacy RAT node 55 or a device within the EPC 58). The apparatus may include or otherwise be in communication with a processor 70, a communication interface 74 and a memory device 76. The memory device 76 may include, for example, one or more volatile and/or non-volatile memories. In other words, for example, the memory device 76 may be an electronic storage device (e.g., a non-transitory computer readable storage medium) comprising gates configured to store data (e.g., bits) that may be retrievable by a machine (e.g., a computing device). The memory device 76 may be configured to store information, data, applications, instructions or the like for enabling the apparatus to carry out various functions in accordance with example embodiments of the present invention. For example, the memory device 76 could be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, processing circuitry, or the like. In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., the mobile terminal 10 or a network device) adapted for employing embodiments of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

In an example embodiment, the processor 70 may be embodied as, include or otherwise control a temporary stored information indicator responder 80 or an indicator support handler 84. As such, in some embodiments, the processor 70 may be said to cause, direct or control the execution or occurrence of the various functions attributed to the temporary stored information indicator responder 80 and the indicator support handler 84 as described herein. The temporary stored information indicator responder 80 and the indicator support handler 84 may each be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the temporary stored information indicator responder 80 and the indicator support handler 84, respectively, as described herein. Thus, in examples in which software is employed, a device or circuitry (e.g., the processor 70 in one example) executing the software forms the structure associated with such means.

In FIG. 4, the indicator support handler 84 is illustrated in dashed lines and the temporary stored information indicator responder 80 is illustrated in alternate dashes and dots in order to distinguish that, when the apparatus is embodied at the legacy RAT node 55, the apparatus may include only the temporary stored information indicator responder 80, but when the apparatus is embodied at one or more of the eNBs, the apparatus may include only the indicator support handler 84.

The temporary stored information indicator responder 80, which may be embodied at the legacy RAT node 55, may be configured to receive a temporary stored information indicator from the UE 50 and determine whether to provide non-temporary information (e.g., the complete neighbor cell list) to replace the temporary information whose storage at the UE 50 is reported by the temporary stored information indicator and/or the network may decide whether to trigger the UE 50 to move into CELL_CH state or CELL_FACH state during a RRC connection establishment procedure based on the status of temporary stored information indicator. In some embodiments, the indicator support handler 84, which may be embodied at one or more of the eNBs 52 and 53, may be further configured to provide an indication of support for the temporary stored information indicator to the UE 50. Accordingly, the network may be enabled to inform the UE 50 that the network supports the replacement of temporary stored information (e.g., a temporary neighbor cell list) with non-temporary information (e.g., a complete neighbor cell list) so that the UE 50 may know in advance whether to send the temporary stored information indicator under appropriate circumstances. In some embodiments, various conditional parameters may be associated with the temporary stored information indicator. For example, while in some cases the temporary stored information indicator may simply indicate that the UE 50 stores a system information container (e.g., temporary information), in other cases, the temporary stored information indicator may further indicate that some particular event has or has not occurred (e.g., that the UE 50 has not yet acquired SIB11, 11bis, or 12 from the serving cell while at least one of them is scheduled on the target cell). The indication of support may be embodied as a new or previously existing information element. In other words, an existing flag, message portion or bit may be employed as the indication of support in some cases, while a new flag, message portion or bit may be created for use as the indication of support in others. Regardless of how the indication of support and the temporary stored information indicator are actually embodied, the temporary stored information indicator responder 80 may be configured to detect the temporary stored information indicator and respond accordingly and the indicator support handler 84 may be configured to generate the indication of support.

Figure 5:
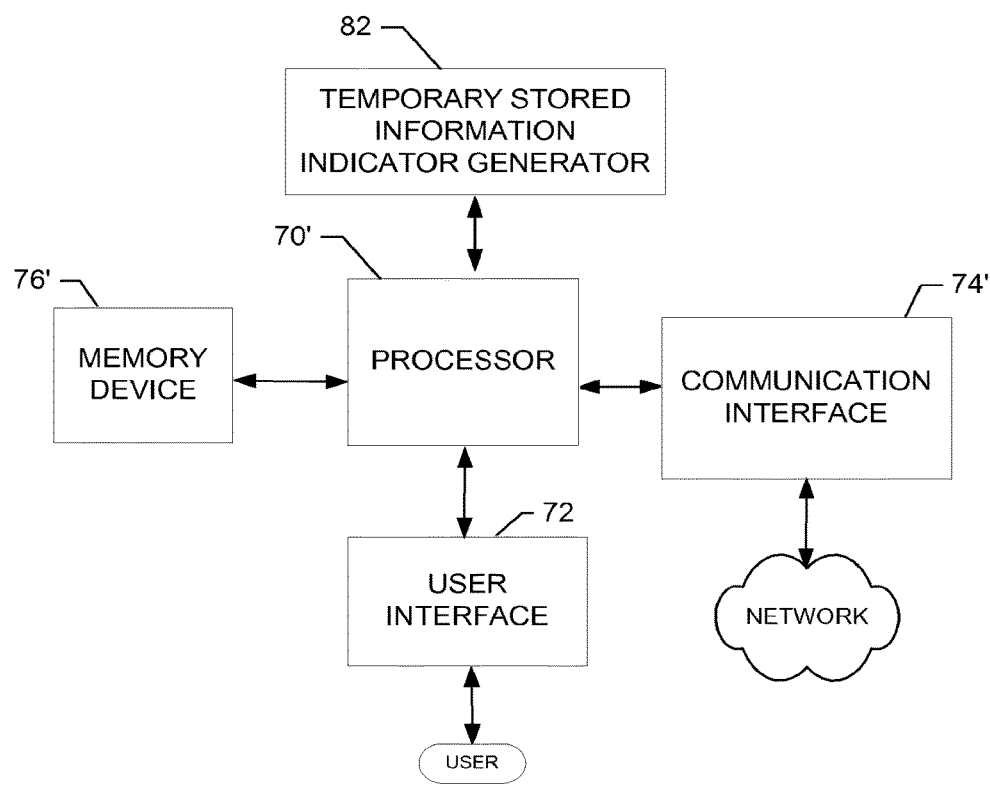
FIG. 5 illustrates a block diagram showing a terminal side apparatus for employing an indication of stored temporary information during redirection according to an example embodiment of the present invention.

FIG. 5 shows a block diagram view of one example of a terminal side apparatus configured to perform example embodiments of the present invention. In this regard, for example, an apparatus for employing an indication of stored temporary information during redirection according to an example embodiment of the present invention from the mobile terminal 10 or UE 50 perspective may include or otherwise be in communication with a processor 70', a user interface 72, a communication interface 74' and a memory device 76'. The processor 70', the communication interface 74' and the memory device 76' may be substantially similar in function and basic structure (with perhaps semantic and/or scale differences in some cases) to the descriptions provided above for the processor 70, the communication interface 74 and the memory device 76 of the network side apparatus. Thus, descriptions of these components will not be repeated.

The user interface 72 may be in communication with the processor 70' to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In some examples, the processor 70' may comprise user interface circuitry configured to control at least some functions of one or more elements of the user interface, such as, for example, a speaker, ringer, microphone, display, and/or the like. The processor 70' and/or user interface circuitry comprising the processor 70' may be configured to control one or more functions of one or more elements of the user interface through computer program instructions (e.g., software and/or firmware) stored on a memory accessible to the processor 70' (e.g., memory device 76', and/or the like).

In an example embodiment, the processor 70' may be embodied as, include or otherwise control a temporary stored information indicator generator 82. As such, in some embodiments, the processor 70' may be said to cause, direct or control the execution or occurrence of the various functions attributed to the temporary stored information indicator generator 82 as described herein. The temporary stored information indicator generator 82 may be any means such as a device or circuitry operating in accordance with software or otherwise embodied in hardware or a combination of hardware and software (e.g., processor 70 operating under software control, the processor 70' embodied as an ASIC or FPGA specifically configured to perform the operations described herein, or a combination thereof) thereby configuring the device or circuitry to perform the corresponding functions of the temporary stored information indicator generator 82 as described herein. Thus, in examples in which software is employed, a device or circuitry (e.g., the processor 70' in one example) executing the software forms the structure associated with such means.

The temporary stored information indicator generator 82 may be configured to provide a temporary stored information indicator from the UE 50 to the temporary stored information indicator responder 80. In some embodiments, the temporary stored information indicator generator 82 may be configured to include the temporary stored information indicator in a uplink RRC message (e.g. RRC connection setup complete message or RRC connection request message) or otherwise as an indication that the UE 50 stores temporary information. In some embodiments, the temporary stored information indicator generator 82 may be further configured to provide the temporary stored information indicator in response to receipt of an indication of support for the temporary stored information indicator from the indicator support handler 84. In some embodiments, various conditional parameters may be associated with the temporary stored information indicator. For example, while in some cases the temporary stored information indicator may simply indicate that the UE 50 stores a system information container (e.g., temporary information), in other cases, the temporary stored information indicator may further indicate that some particular event has or has not occurred (e.g., that the UE 50 has not yet acquired SIB11, 11bis, or 12 from the serving cell while at least one of them is scheduled on the target cell). The temporary stored information indicator may be embodied as a new or previously existing information element. In other words, an existing flag or bit may be employed as the temporary stored information indicator in some cases, while a new flag or bit may be created for use as the temporary stored information indicator in others. Regardless of how the temporary stored information indicator is actually embodied, the temporary stored information indicator generator 82 may be configured to generate the temporary stored information indicator appropriately.

FIG. 6 is a basic flow diagram illustrating an example embodiment of the present invention that is flexible and modifiable to create several different implementation examples as described below. In this regard, as shown in FIG. 6, the E-UTRAN may send an RRC CONNECTION RELEASE message with a system information container for target cells at operation 100. The UE may then store the SIBS given by the system information container when the UE is camped on the target cell at operation 110. The UE may send an RRC CONNECTION request at operation 120. At operation 130, the UE may receive an RRC CONNECTION SETUP message from the network. The UE may then send an RRC CONNECTION SETUP COMPLETE message back to the network at operation 140. At operation 150, the network may provide a complete intra-frequency measurement neighbor cell list to the UE via a MEASUREMENT CONTROL message. Various example perturbations of the basic flow will now be described to illustrate some example embodiments.

In a first example, operation 120 may be modified such that the RRC CONNECTION REQUEST may be generated to include the temporary stored information indicator (e.g., a system information container stored indicator/SI container stored indicator) indicating that the UE stores temporary information. In such example, operation 150 may be executed in response to the network receiving the temporary stored information indicator or operation 140 may be executed with an RRC state indicator, which may be set based on the status of the temporary stored information indicator.

In a first example, operation 140 may be modified such that the RRC CONNECTION SETUP COMPLETE may be generated to include the temporary stored information indicator (e.g., a system information container stored indicator) indicating that the UE stores temporary information. In such example, operation 150 may be executed in response to the network receiving the temporary stored information indicator.

In a second example, the RRC CONNECTION RELEASE message of operation 100 may include the indication of support if the target radio network controller (RNC) allows the UE to send the temporary stored information indicator (and does not include the temporary stored information indicator otherwise). The above described modifications from the first example may then be applicable, but with a conditional requirement in operation 140 that the indication of support is received by the UE.

In a third example, operation 140 may be modified such that the RRC CONNECTION SETUP COMPLETE may be generated subject to a conditional requirement that the temporary stored information indicator (e.g., a system information container stored indicator) is included if the UE stores the system information container and the UE has not yet not yet acquired SIB11, 11bis, or 12 from the serving cell while at least one of them is scheduled on the target cell. In such example, operation 150 may be executed in response to the network receiving the temporary stored information indicator.

In a fourth example, the RRC CONNECTION RELEASE message of operation 100 may include the indication of support if the target radio network controller (RNC) allows the UE to send the temporary stored information indicator (and does not include the temporary stored information indicator otherwise). The above described modifications from the third example may then be applicable, but with a conditional requirement in operation 140 that the indication of support is received by the UE.

As indicated above, the temporary stored information indicator and the indication of support may each be an existing flag or information element or may be some newly created flag or information element. Thus, for example, the temporary stored information indicator could be a new element such as a "SI container stored indicator" or may be an existing element such as a "deferred measurement control reading". As another example, the indication of support may be a "SI container stored indicator NW support" indicator or a "deferred measurement control UTRAN support" indicator in the SIB3. In some alternatives, combinations of existing and new elements may be employed.

Accordingly, embodiments of the present invention may provide for a robust and flexible mechanism by which to provide for bandwidth savings associated with use of a temporary neighbor cell list (e.g., a subset of a full neighbor cell list) for the redirection procedure so that RIM and deferred measurement features need not be employed. Embodiments may also provide for reduction in the size of the RRC CONNECTION RELEASE message since it will typically not need to include a complete neighbor cell list.

FIGS. 7 and 8 are flowcharts of a method and program product according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of the mobile terminal or network device and executed by a processor in the mobile terminal or network device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowcharts block(s). These computer program instructions may also be stored in a computer-readable memory that may direct a computer or other programmable apparatus to function in a particular manner, such that the instructions stored in the computer-readable memory produce an article of manufacture including instruction means which implement the function specified in the flowcharts block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts block(s).

Accordingly, blocks of the flowcharts support combinations of means for performing the specified functions, combinations of operations for performing the specified functions and program instruction means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In this regard, a method according to one embodiment from the network side perspective, as shown in FIG. 7, may include receiving a temporary stored information indicator from a mobile terminal indicating that the mobile terminal stores a system information container comprising temporary information at operation 210. The method may further include determining whether to replace the temporary information with non-temporary information and/or the network may decide whether to trigger UE to move into CELL_DCH state or CELL_FACH state during a RRC connection establishment procedure based on reception of the temporary stored information indicator at operation 220. In an example embodiment, an optional initial operation may be included at operation 200, which may include providing an indication of support for the temporary stored information indicator to the mobile terminal. In an example embodiment, operations 210 and 220 may be performed at the network side by a legacy RAT node (e.g., legacy RAT node 55), while operation 200 may be performed by an eNB (e.g., eNB 52 or eNB 53).

In some embodiments, certain ones of the operations above may be modified or further amplified as described below. It should be appreciated that each of the modifications or amplifications below may be included with the operations above either alone or in combination with any others among the features described herein. In this regard, for example, the temporary stored information indicator may be a new or existing flag or information element. Similarly, the indication of support may be a new or existing flag or information element. In some cases, the temporary information may be a temporary neighbor cell list that is a subset of a complete neighbor cell list. The non-temporary information may therefore be the complete neighbor cell list. In some cases, receiving the temporary stored information indicator may include receiving an indication that a conditional requirement with respect to connection to a target cell is met.

In an example embodiment, an apparatus for performing the method of FIG. 7 above may comprise a processor (e.g., the processor 70) configured to perform some or each of the operations (200-220) described above. The processor may, for example, be configured to perform the operations (200-220) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-220 may comprise, for example, the processor 70, the temporary stored information indicator 80, the indicator support handler 84, and/or a device or circuit for executing instructions or executing an algorithm for processing information as described above.

An alternative method according to one embodiment from the terminal perspective, as shown in FIG. 8, may include receiving a system information container for at least one target cell at operation 300. The method may further include storing the system information container at operation 310. The method may further include generating a temporary stored information indicator at a mobile terminal indicating that the mobile terminal stores the system information container comprising temporary information at operation 320.

In some embodiments, certain ones of the operations above may be modified or further amplified as described below. It should be appreciated that each of the modifications or amplifications below may be included with the operations above either alone or in combination with any others among the features described herein. In this regard, for example, receiving the system information container may include further receiving an indication of support for the temporary stored information indicator. In some embodiments, the temporary stored information indicator may be a new or existing flag or information element. Similarly, the indication of support may be a new or existing flag or information element. In some cases, the temporary information may be a temporary neighbor cell list that is a subset of a complete neighbor cell list. The non-temporary information may therefore be the complete neighbor cell list. In some cases, generating the temporary stored information indicator may include generating the indicator indicating that a conditional requirement with respect to connection to a target cell is met. In some embodiments, generating the temporary stored information indicator may be performed responsive to receipt of the indication of support.

In an example embodiment, an apparatus for performing the method of FIG. 8 above may comprise a processor (e.g., the processor 70') configured to perform some or each of the operations (300-320) described above. The processor may, for example, be configured to perform the operations (300-320) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300-320 may comprise, for example, the processor 70', the temporary stored information generator 82, and/or a device or circuit for executing instructions or executing an algorithm for processing information as described above.

An example of an apparatus according to an example embodiment may include at least one processor and at least one memory including computer program code. The at least one memory and the computer program code may be configured to, with the at least one processor, cause the apparatus to perform the operations 200-220 (with or without the modifications and amplifications described above in any combination).

An example of a computer program product according to an example embodiment may include at least one computer-readable storage medium having computer-executable program code portions stored therein. The computer-executable program code portions may include program code instructions for performing operation 200-220 (with or without the modifications and amplifications described above in any combination).

An example of an apparatus according to another example embodiment may include at least one processor and at least one memory including computer program code. The at least one memory and the computer program code may be configured to, with the at least one processor, cause the apparatus to perform the operations 300-320 (with or without the modifications and amplifications described above in any combination).

An example of a computer program product according to another example embodiment may include at least one computer-readable storage medium having computer-executable program code portions stored therein. The computer-executable program code portions may include program code instructions for performing operation 300-320 (with or without the modifications and amplifications described above in any combination).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving a system information container comprising temporary information for at least one target cell, as part of a connection release message during redirection, wherein the temporary information comprises a temporary neighbor cell list that is a subset of a complete neighbor cell list provided by a network element such that the temporary neighbor cell list is reduced relative to the complete neighbor cell list provided by the network element;
   generating a temporary stored information indicator at a mobile terminal indicating that the mobile terminal stores the system information container;
   receiving, following generation of the temporary stored information indicator, non-temporary information comprising the complete neighbor cell list; and
   causing a replacement of the temporary information with the non-temporary information once the connection requirement to the target cell is met.

2. The method of claim 1, wherein receiving the system information container comprises receiving an indication of support for the temporary stored information indicator.

3. The method of claim 2, wherein the indication of support comprises a new information element or an existing information element.

4. The method of claim 2, wherein generating the temporary stored information indicator is performed responsive to receipt of the indication of support.

5. The method of claim 1, further comprising causing storage of the system information container.

6. The method of claim 1, wherein the temporary stored information indicator indicates that the mobile terminal stores the system information container and that a condition requirement with respect to connection to a target cell is met.

7. The method of claim 1, wherein the temporary stored information indicator comprises a new information element or an existing information element.

8. An apparatus comprising at least one processor and at least one memory including computer program code, the at least one memory and the computer program code configured to, with the at least one processor, cause the apparatus at least to:
   receive a system information container comprising temporary information for at least one target cell, as part of a connection release message during redirection, wherein the temporary information comprises a temporary neighbor cell list that is a subset of a complete neighbor cell list provided by a network element such that the temporary neighbor cell list is reduced relative to the complete neighbor cell list provided by the network element;
   generate a temporary stored information indicator at a mobile terminal indicating that the mobile terminal stores the system information container;
   receive, following generation of the temporary stored information indicator, non-temporary information comprising the complete neighbor cell list; and
   cause a replacement of the temporary information with the non-temporary information once the connection requirement to the target cell is met.

9. The apparatus of claim 8, wherein the at least one memory and the computer program code are further configured to, with the at least one processor, cause the apparatus to receive the system information container by receiving an indication of support for the temporary stored information indicator.

10. The apparatus of claim 9, wherein the indication of support comprises a new information element or an existing information element.

11. The apparatus of claim 9, wherein the at least one memory and the computer program code are further configured to, with the at least one processor, cause the apparatus to generate the temporary stored information indicator responsive to receipt of the indication of support.

12. The apparatus of claim 8, wherein the at least one memory and the computer program code are further configured to, with the at least one processor, cause the apparatus to cause storage of the system information container.

13. The apparatus of claim 8, wherein the temporary stored information indicator indicates that the mobile terminal stores the system information container and that a condition requirement with respect to connection to a target cell is met.

14. The apparatus of claim 8, wherein the temporary stored information indicator comprises a new information element or an existing information element.

15. A computer program product comprising at least one non-transitory computer-readable storage medium bearing computer program code embodied therein for use with a computer, the computer program code comprising code for:
   receiving a system information container comprising temporary information for at least one target cell, as part of a connection release message during redirection, wherein the temporary information comprises a temporary neighbor cell list that is a subset of a complete neighbor cell list provided by a network element such that the temporary neighbor cell list is reduced relative to the complete neighbor cell list provided by the network element;
   generating a temporary stored information indicator at a mobile terminal indicating that the mobile terminal stores the system information container;
   receiving, following generation of the temporary stored information indicator, non-temporary information comprising the complete neighbor cell list; and
   causing a replacement of the temporary information with the non-temporary information once the connection requirement to the target cell is met.

16. The computer program product of claim 15, wherein code for receiving the system information container includes code for receiving an indication of support for the temporary stored information indicator.

17. The computer program product of claim 16, wherein the indication of support comprises a new information element or an existing information element.

18. The computer program product of claim 16, wherein the code for generating the temporary stored information indicator comprises code for generating the temporary stored information indicator responsive to receipt of the indication of support.

19. The computer program product of claim 15, wherein the computer program code further comprises code for causing storage of the system information container.

20. The computer program product of claim 15, wherein the temporary stored information indicator indicates that the mobile terminal stores the system information container and that a condition requirement with respect to connection to a target cell is met.

\* \* \* \* \*